Nov. 5, 1929.                H. A. S. HOWARTH                1,734,906
                                  BEARING
                          Filed Sept. 1, 1922        3 Sheets-Sheet 3

Inventor
Harry A. S. Howarth
By Mauro, Cameron, Lewis & Kerkam
                              Attorneys Patented Nov. 5, 1929

1,734,906

UNITED STATES PATENT OFFICE

HARRY A. S. HOWARTH, OF PHILADELPHIA, PENNSYLVANIA, ASSIGNOR, BY MESNE ASSIGNMENTS, TO KINGSBURY MACHINE WORKS, INC., OF PHILADELPHIA, PENNSYLVANIA, A CORPORATION OF DELAWARE

BEARING.

Application filed September 1, 1922. Serial No. 585,677.

This invention relates to bearings and, more particularly, to thrust bearings for horizontal or inclined shafts.

It is an object of this invention to provide a bearing including one or more bearing shoes mounted on a closure member for a suitable aperture in the bearing housing, so as to facilitate assembly, disassembly, inspection and repair of the bearing parts.

Another object of this invention is to provide a thrust bearing for a horizontal or inclined shaft having a rotatable thrust collar including one or a plurality of bearing shoes for cooperation with one or opposed faces of said thrust collar which are adapted to be moved into and out of cooperative relation with said thrust collar by a closure member for a suitable aperture in the bearing housing.

Another object of this invention is to provide a thrust bearing for a horizontal or inclined shaft, including a rotatable thrust collar and an oil well into which said collar dips, with one or a pair of bearing shoes for cooperation with one or the opposed faces of said thrust collar above the level of the oil in the oil well, where said shoes are readily accessible for inspection and adjustment, and constituting a unit with a closure member for a suitable aperture in the bearing housing, whereby said shoe or shoes may be readily inserted into and withdrawn from operative position without withdrawing the oil from said oil well.

Another object of this invention is to provide a thrust bearing for a horizontal or inclined shaft provided with a rotatable thrust collar and a journal bearing extending into proximity to said thrust collar with one or more bearing shoes cooperating with said collar to sustain the thrust pressure and also maintain a copious supply of lubricant to said journal bearing.

Other objects relate to the provision of a thrust bearing for a horizontal or inclined shaft with an oil well into and from which suitable lengths of cooling coil may be readily inserted and withdrawn through a bottom aperture without dismantling the bearing; the provision of a thrust bearing for a horizontal or inclined shaft with a housing so related to the end of the shaft that the thrust collar may be readily withdrawn without dropping the bearing housing; the provision of a bearing unit for thrust bearings for horizontal or inclined shafts which can be standardized and manufactured for ready application to a wide variety of structures; the provision of a thrust bearing for a horizontal or inclined shaft, of the single shoe or double shoe type as the bearing is to sustain thrust in one or both directions, which is particularly simple in construction, inexpensive to manufacture, and easy to assemble, adjust, disassemble and repair.

Stated broadly the invention, as applied to a thrust bearing for a horizontal or inclined shaft, includes one or more bearing shoes adapted to cooperate with a thrust collar on said shaft and mounted on a closure member for a suitable aperture in the bearing housing; said bearing shoes preferably being suspended on said closure member in cooperative relation with the upper portion of said thrust collar. When said thrust bearing is used in conjunction with a journal bearing, the latter is preferably extended into proximity to the thrust collar and cut away adjacent said shoe or shoes, whereby said journal bearing may be copiously supplied with lubricant deflected thereto by the cooperation of said shoe or shoes with said thrust collar.

The invention is capable of receiving a variety of mechanical expressions, one of which is shown on the accompanying drawings, but it is to be expressly understood that the drawings are for purposes of illustration only and are not to be construed as a definition of the limits of the invention, reference being had to the appended claims for that purpose.

Referring in detail to said drawings, wherein the same characters of reference are used to designate corresponding parts in the several figures:—

Figure 1:
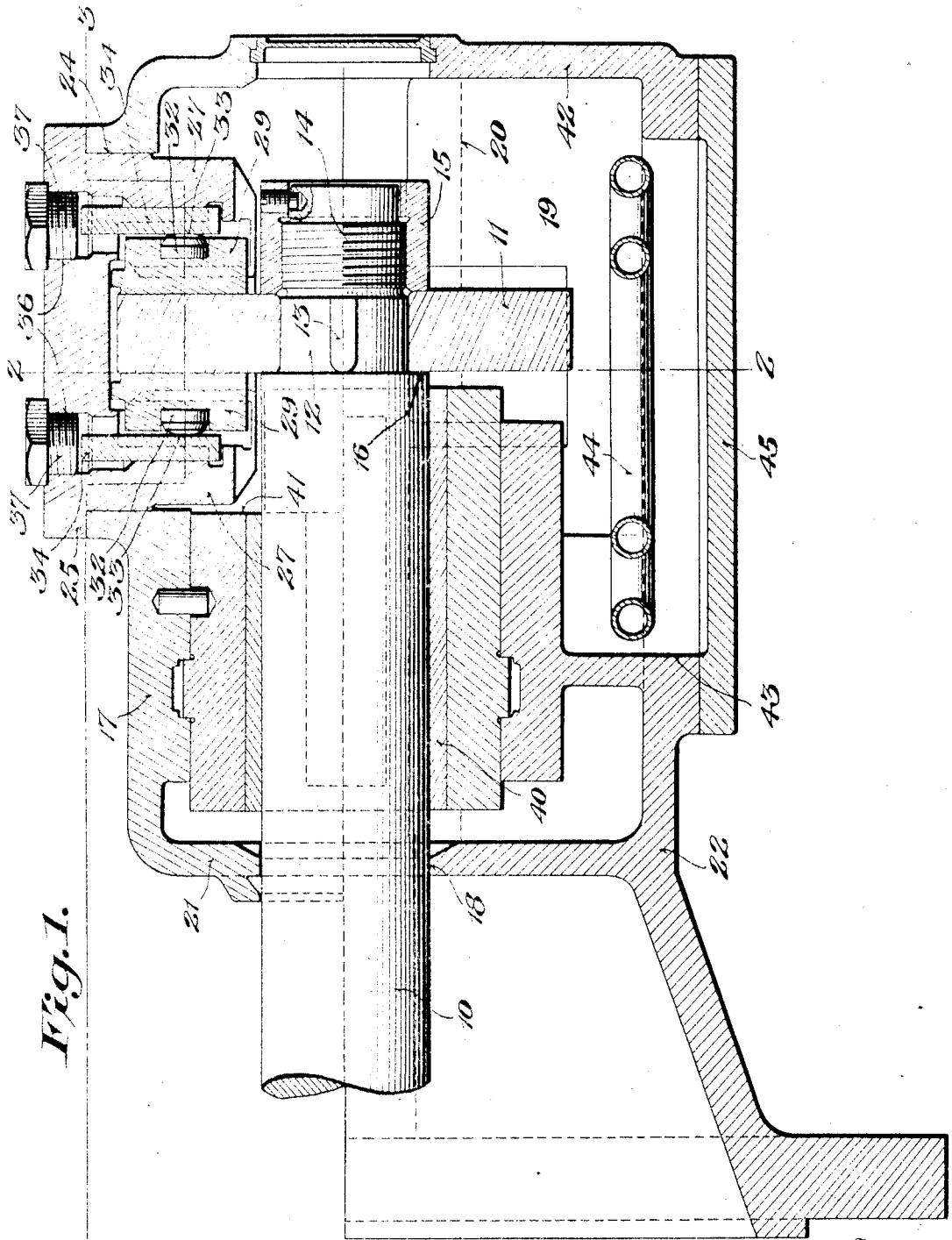
Fig. 1 is an axial section through a thrust bearing for a horizontal shaft embodying the present invention.

In the form shown, a horizontal shaft 10 has mounted thereon, in any suitable way, a thrust collar 11 of any suitable size. In the construction illustrated, the shaft 10 has its end section 12 of reduced diameter on which the collar 11 is keyed at 13, and said section of reduced diameter extends beyond the thrust collar and is threaded, as shown at 14, to receive a ring nut 15, between which and the shoulder 16 on the shaft 10 the thrust collar 11 is fixedly held in position.

Figure 2:
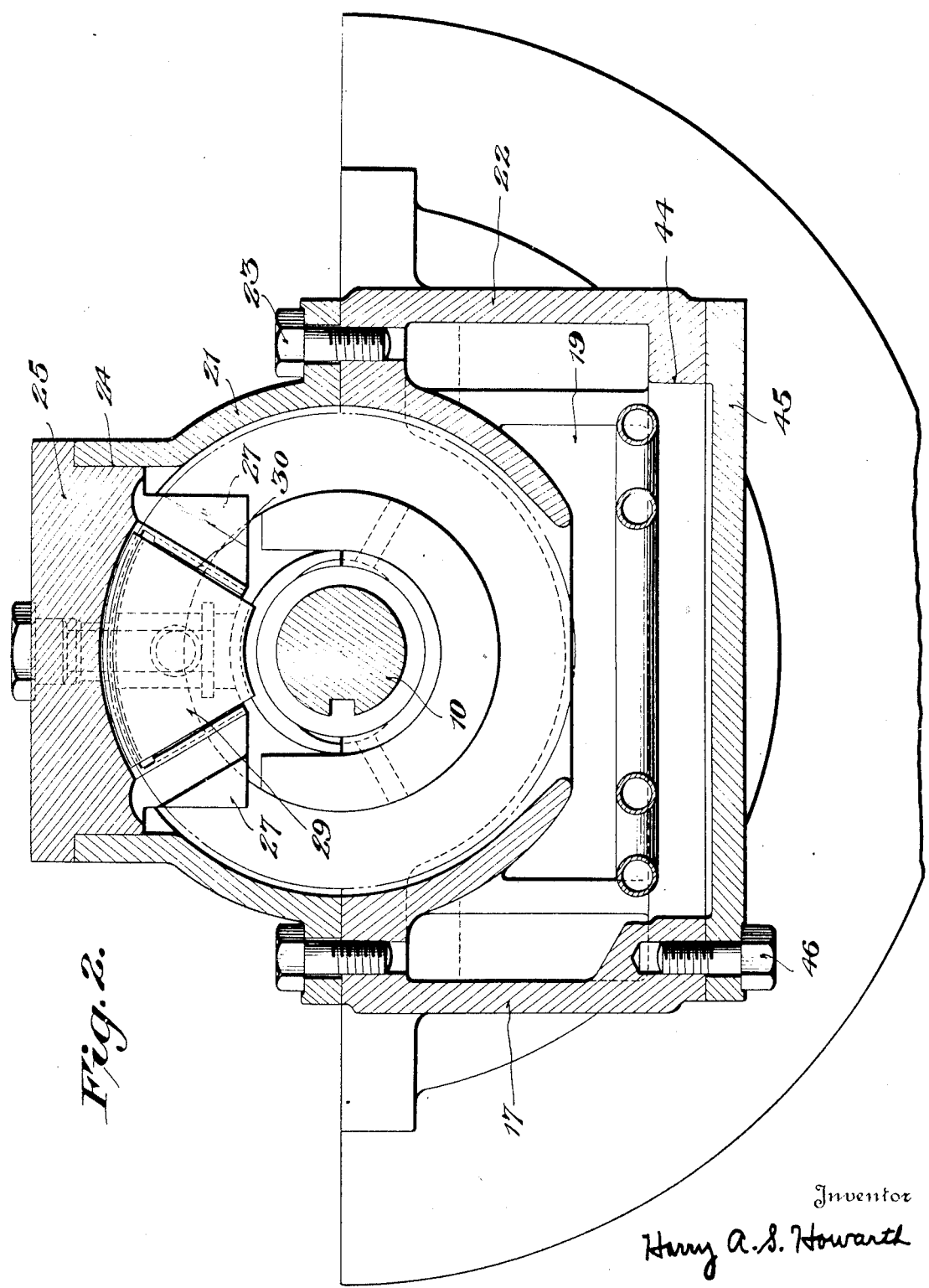
Fig. 2 is a transverse section on the line 2—2 of Fig. 1.

Surrounding the thrust collar 11 is a bearing housing 17, of any suitable construction, provided with an aperture 18 through which the shaft 10 enters said housing and a chamber 19 which constitutes an oil well into which the thrust collar 11 dips as it rotates. The level of the oil in the well is preferably maintained somewhat below the level of the shaft opening 18, at approximately the height indicated by the dotted line 20. The bearing housing 17, as shown in Fig. 2, is preferably formed of separable upper and lower portions 21 and 22, which are suitably connected, as by the bolts 23.

Figure 3:
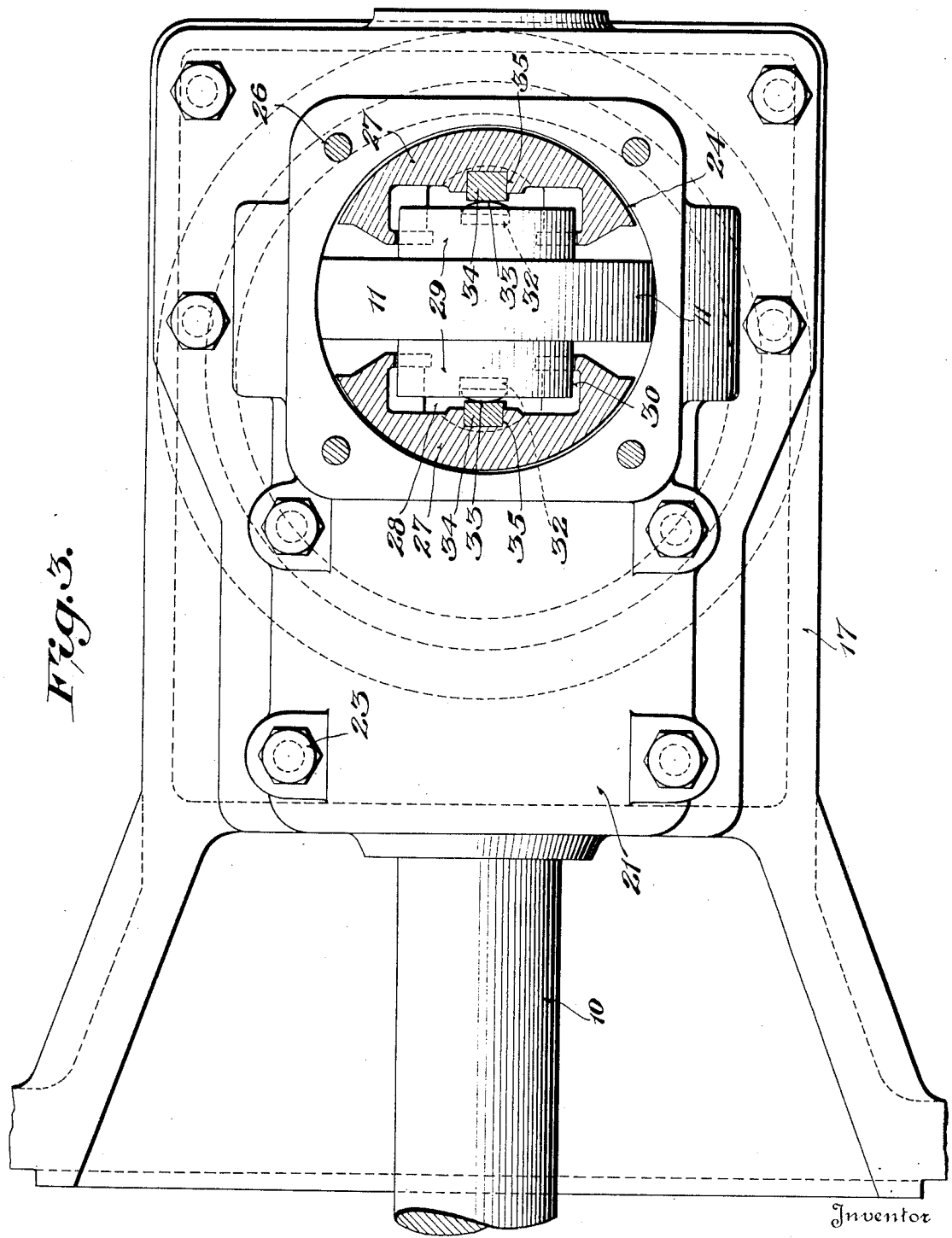
Fig. 3 is a plan view with the closure member shown in section on the line 3—3 of Fig. 1.

Bearing housing 17 is also provided adjacent the thrust collar, and preferably in the top of the housing, with a large aperture 24 which is designed to receive a closure member or cap 25 which may be secured to the housing in any suitable way, as by one or more bolts indicated at 26 in Fig. 3. Extending from said closure member 25 on either side of the thrust collar 11 is a projection 27 so formed as to provide a recess 28 in which a bearing shoe 29 is mounted for cooperation with a face of the thrust collar 11. Said bearing shoes 29 may be of any suitable construction, but are preferably formed as sectors of an annulus, and the sides of each recess 28 therefore preferably incline downwardly in a generally radial direction, as shown at 30 in Fig. 2, in close proximity and substantially parallel to the sides of the shoe, so as to retain said shoe in operative position against displacement both circumferentially and radially of the shaft. Thereby each shoe is suspended in its recess 28 in position for cooperation with the corresponding side of the thrust collar 11. It is to be expressely understood, however, that any other suitable means may be employed for retaining the shoes in their proper position on the closure member 25 for cooperation with the thrust collar 11.

Each bearing shoe is also preferably mounted to tilt both circumferentially and radially of the axis of the bearing, so as to permit the automatic formation of wedge-shaped oil film between the cooperating bearing surfaces and the equalization of the bearing pressure on the inner and outer zonal portions of the bearing surfaces in conformity with the principles of the Kingsbury bearings. This tiltable mounting of the bearing shoes may be effected in any suitable way, each bearing shoe being shown as provided with a hardened insert 32 positioned in a recess in the rear face of the shoe and provided with a spherical surface 33 for engagement with a suitable supporting surface. Means are also preferably provided whereby each shoe may be adjusted toward and away from the opposed face of the thrust collar. In the form shown, each bearing shoe 29 is mounted on a spacing or filling piece 34 which may be inserted into and withdrawn from operative position by movement in a groove or channel 35 formed in the rear wall of the recess 28. To facilitate adjustment of the shoes and the insertion and withdrawal of the spacing pieces 34 without the necessity of removing the entire closure member 25 together with the bearing shoes mounted thereon, said closure member 25 is preferably provided with an aperture 36 opposite each of the grooves or channels 35, which apertures may receive closure members of any suitable construction, such as the short threaded bolts or plugs 37 illustrated in Fig. 1.

When the bearing is also provided with a steady or guide bearing 40, the bearing housing is preferably made sufficiently long, as shown in Fig. 1, so as to enclose said journal bearing, and said journal bearing 40 is made to extend into close proximity to the thrust collar 11 and the upper portion of its shell is cut away, as shown at 41, so as to afford a recess into which the bearing shoe 29 and its supporting member 27 projects. Thereby oil removed from the face of the thrust collar by the action of the leading edge of the bearing shoe 29 is deflected onto the shaft 10, where it is exposed at said cut away portion 41, and the journal bearing 40 is thereby maintained flooded with oil.

The wall 42 of the bearing housing 17 opposite the free end of the shaft in at least the lower part of the bearing housing is preferably spaced from said free end of the shaft sufficiently to permit the thrust collar 11 to be removed from the end of the shaft, when the ring nut 15 has been withdrawn, so as to enable the thrust collar to be removed from the shaft without dropping the bearing housing.

The lower portion of the bearing housing, which affords the chamber constituting the oil well, may also be enlarged to provide a generally cylindrical chamber 43, as shown in Fig. 1, so that one or more cooling coil sections 44 may be positioned in the oil well below the thrust collar. While with a thrust bearing of the single or double shoe type of the character illustrated the oil will probably not be sufficiently heated to require the use of a cooling coil, there are conditions under which it may be desirable to provide cooling means for the lubricant in the well, in which event the cylindrical chamber 43 provides space for the introduction of cooling coil elements of any suitable size. To facilitate the insertion and withdrawal of the cooling coil sections, the lower wall 45 of the bearing housing opposite the cylindrical chamber 43 is preferably made removable and can be retained in operative position in any suitable way, as by bolts 46.

In operation, the collar 11, rotating with the shaft 10, dips into the oil in the oil well 19 and carries oil upwardly on its surface to the bearing shoes 29 located in the upper portion of the bearing housing. As the quantity of oil carried upwardly by the collar is in excess of that required for the formation of oil films between the bearing surfaces of the shoes 29 and the collar 11, some of the oil will be removed from the face of the collar by the leading edge of the shoe 29 cooperating with the left-hand face of the collar as viewed in Fig. 1. This oil will flow radially downward and inward along the leading edge of the shoe and onto the shaft 10 where it is exposed by the cut away portion 41 of the journal bearing shell. Thereby said journal bearing will be copiously lubricated by maintaining the same flooded with oil, the oil flowing between the journal surfaces and returning to the oil well through the open spaces existing at either end of the journal bearing. If desired, however, the oil supplied to the shoe or shoes and journal bearing or bearings may be supplemented by collecting oil from the periphery of the thrust collar in any suitable way, as by use of an oil-scraper or a recess in the housing into which the oil is thrown or collects from said periphery, whence it will flow downwardly over the faces of said collar and augment the supply of lubricant to the bearing surfaces.

The bearing shoes 29, owing to their support on the spherical surfaces of the inserts 32, may tilt circumferentially to form wedge-shaped oil films between the bearing surfaces of said shoes and the faces of the thrust collar; and may also tilt radially to equalize the pressure on the inner and outer zonal portions of said bearing surfaces. Moreover, in view of this freedom of movement of the bearing shoes, it is not essential that the thrust collar run absolutely true in a plane at right angles to the axis of the shaft, as the shoes may readily conform to the planes of rotation of the faces of the thrust collar. Said shoes are maintained in proper cooperative relation with the faces of the thrust collar by the spacing or filling pieces 34, and as the parts wear, adjustment can be readily effected by withdrawing the threaded plugs 37 and either inserting new spacing pieces 34 or introducing shims in the grooves 35 between said spacing pieces and the bottom of the grooves.

What it is desired to withdraw the shoes from cooperative relation with the thrust collar, it is only necessary to remove the closure member 25, and the bearing shoes 29, which are retained in the recesses 28 by the cooperation of the inwardly and downwardly inclined sides 30 of said recesses with the sides of said shoes, will be withdrawn with said closure member. Therefore, the bearing shoes and the closure member may be withdrawn from operative position as a unit for ready inspection and repair of the bearing parts, and this may be accomplished without the necessity of removing the upper part 21 of the bearing housing 17. Moreover, as the aperture 24 is above the level of the oil in the well, it is unnecessary to drain the oil from the well in order to remove or inspect the bearing shoes and, particularly when the aperture 24 is positioned at the top of the bearing housing as shown on the drawings, said shoes are easily accessible at all times.

By locating the journal bearing in close proximity to the thrust collar and cutting away its shell to receive the bearing shoe, said bearing may be copiously lubricated without the necessity of using oiling rings or an oil scraper for deflecting oil from the periphery of the collar to said bearing. By spacing the wall of the housing from the end of the shaft as shown, the collar can be readily mounted in and withdrawn from operative position without the necessity of dropping the bearing housing. By providing the cylindrical chamber in the oil well at the bottom of the bearing housing, together with the closure member 45, cooling coil elements of any suitable length may be readily inserted into or withdrawn from the oil well when the conditions are such as to require the same.

It will thus be perceived that I have invented a bearing unit for thrust bearings which is particularly simple in construction and inexpensive to manufacture, which can be readily standardized, and which can be used in thrust bearings for a wide variety of structures. While I have illustrated and described the thrust bearing unit as comprising a pair of shoes, one positioned for cooperation with each of the opposed faces of the thrust collar when the bearing is designed to receive thrust in both directions, such is not essential, as the unit may include only a single shoe when the bearing is to sustain thrust in one direction only. Furthermore, while but a single shoe has been illustrated as cooperating with each face of the thrust collar, and such is the construction preferred by me, the invention is not limited thereto, as the bearing unit could be modified so as to include two or more bearing shoes mounted on the closure member for cooperation with one or both faces of the thrust collar within the broad contemplation of this invention. Furthermore, while I have shown the aperture 24 and the closure member 25 as positioned at the top of the bearing housing, such is not essential, as the closure member may be positioned more or less to the side of the bearing housing; it is preferably spaced above the level of the oil in the oil-well, however, so as not to necessitate draining of the oil-well when the shoes are to be inspected or withdrawn, and I prefer to so position said closure member that the bearing shoe or shoes will be suspended in cooperative relation with the uppermost portion of the thrust collar so as to obtain the benefits pointed out in Kingsbury Patent No. 1,412,353, granted April 11, 1922. If the bearing shoe or shoes are not positioned to cooperate with the uppermost part of the thrust collar, the shell of the journal bearing 40 may still be cut away in proximity to the shoe or shoes so as to provide a recess into which the bearing shoe will deflect oil from the face of the thrust collar, and said journal bearing may still be adequately lubricated by oil thus directed thereto.

While the embodiment of the invention illustrated on the drawings has thus been described with considerable particularity, it is to be expressly understood that the invention is not restricted thereto, as the same is capable of receiving a variety of mechanical expressions some of which will now readily suggest themselves to those skilled in the art, while changes may be made in the details of construction, proportion and arrangement of parts, and certain features may be used without other features thereof, without departing from the spirit of this invention. Reference is therefore to be had to the claims hereto appended for a definition of the limits of the invention.

What is claimed is:—

1. A thrust bearing for horizontal or inclined shafts including the combination of a rotatable thrust collar, a housing therefor provided with an aperture, a closure member for said aperture, a bearing shoe carried by and removable with said closure member, said shoe being mounted on said closure member in cooperative relation with said thrust collar, and means on said closure member to engage said shoe laterally for removal thereof.

2. A thrust bearing for horizontal or inclined shafts including the combination of a rotatable thrust collar, a housing therefor provided with an aperture adjacent the top of said housing, a closure member for said aperture provided with means for laterally engaging a shoe, and a bearing shoe suspended on said closure member in cooperative relation with said thrust collar and removable with said closure member.

3. A thrust bearing for horizontal or inclined shafts including the combination of a rotatable thrust collar, a housing therefor provided with an aperture opposite the periphery of said thrust collar, a closure member for said aperture, a pair of bearing shoes carried by and removable with said closure member, said shoes being mounted on said closure member in cooperative relation with the opposed faces of said thrust collar, and means on said closure member to laterally engage said shoes for removal thereof.

4. A thrust bearing for horizontal or inclined shafts including the combination of a rotatable thrust collar, a housing therefor provided with an aperture, a closure member for said aperture, a bearing shoe cooperating with said thrust collar, and means on said closure member for laterally engaging and moving said shoe into and out of operative position.

5. A thrust bearing for horizontal or inclined shafts including the combination of a rotatable thrust collar, a housing therefor provided with an aperture, a closure member for said aperture, a bearing shoe cooperating with said thrust collar, and lateral shoe-engaging means on said closure member for restraining said shoe against rotational displacement and for removing said shoe.

6. A thrust bearing for horizontal or inclined shafts including the combination of a rotatable thrust collar, a housing therefor provided with an aperture, a closure member for said aperture, a bearing shoe cooperating with said thrust collar, and depending lateral shoe-engaging means on said closure member for retaining said shoe against rotational displacement and in operative relation to said collar.

7. A thrust bearing for horizontal or inclined shafts including the combination of a rotatable thrust collar, a housing therefor provided with an aperture, a closure member for said aperture, one or more bearing shoes tiltably mounted on said closure member and cooperating with said thrust collar, and means on said closure member for engaging the sides of and withdrawing said shoes when said closure member is removed.

8. A thrust bearing for horizontal or inclined shafts including the combination of a rotatable thrust collar, a housing therefor provided with an aperture, a closure member for said aperture, a bearing shoe cooperating with said thrust collar, and means on said closure member removable independently thereof on which said shoe is tiltably mounted.

9. A thrust bearing for horizontal or inclined shafts including the combination of a rotatable thrust collar, a housing therefor provided with an aperture, a closure member for said aperture, one or more bearing shoes cooperating with said thrust collar, and one or more removable spacing pieces on said closure member on which said shoes are mounted.

10. A thrust bearing for horizontal or inclined shafts including the combination of a rotatable thrust collar, a housing therefor provided with an aperture, a closure member for said aperture, one or more bearing shoes cooperating with said thrust collar, and one or more removable spacing pieces on said closure member on which said shoes are mounted, said closure member having apertures through which said spacing pieces may be inserted and withdrawn.

11. A combined guide and thrust bearing for horizontal or inclined shafts including a rotatable thrust collar, a journal bearing adjacent thereto, an oil well into which said thrust collar dips, and a bearing shoe cooperating with said thrust collar and adapted to remove oil from said collar and direct it to said journal bearing.

12. A combined guide and thrust bearing for horizontal or inclined shafts including a rotatable thrust collar, an oil well into which said collar dips, a bearing shoe cooperating with the face of said thrust collar above the level of said shaft, and a journal bearing extending beneath said bearing shoe and lubricated by oil removed from said collar by said shoe.

13. A combined guide and thrust bearing for horizontal or inclined shafts including a rotatable thrust collar, an oil well into which said collar dips, a bearing shoe cooperating with said collar above the level of the oil in the well, and a journal bearing extending into proximity to said shoe and lubricated by oil removed from said collar by said shoe.

14. In a combined guide and thrust bearing for horizontal or inclined shafts, a rotatable thrust collar, an oil well into which said collar dips, a bearing shoe cooperating with said collar above the level of the oil in said well, and a journal bearing extending into proximity to said bearing shoe and having a portion cut away to receive oil directed thereto by said bearing shoe.

15. In a combined guide and thrust bearing for horizontal or inclined shafts, a rotatable thrust collar, an oil well into which said collar dips, a journal bearing extending into proximity to said shaft and having its upper portion cut away adjacent said collar, and a bearing shoe cooperating with the upper portion of the face of said collar and directing oil into said journal bearing through said cut away portion.

16. A thrust bearing for horizontal or inclined shafts including a rotatable thrust collar, a housing therefor provided with an aperture, a closure member for said aperture provided with one or more recesses adapted to embrace and prevent relative displacement of the shoes, and one or more bearing shoes mounted in said recesses in operative relation to said collar when said closure member closes said aperture.

17. A thrust bearing for horizontal or inclined shafts including a rotatable thrust collar, one or more bearing shoes cooperating with said thrust collar, and a housing for said bearing members spaced from the end of the shaft sufficiently to permit removal of said collar from said shaft without dropping the bearing housing.

18. A bearing comprising a rotatable bearing member, a housing for said bearing member provided with an aperture, a cap for said aperture provided with downwardly and inwardly inclined surfaces adapted to engage the radial edges of a bearing segment, and one or more bearing shoes tiltably mounted on said cap.

19. A bearing unit for thrust bearings for horizontal or inclined shafts including a cap for closing an aperture in a thrust bearing housing, one or more bearing shoes carried by said cap in position to cooperate with a thrust collar on said shaft when said cap is positioned to close said aperture, and means on said cap for engaging the sides of said shoes.

20. A bearing unit for thrust bearings for horizontal or inclined shafts including a cap for closing an aperture in a bearing housing and provided with downwardly and inwardly inclined shoe engaging surfaces, and one or more bearing shoes suspended on said cap and adapted to be inserted into and withdrawn from cooperative relation with a thrust collar by movement of said cap.

21. A bearing unit comprising a cap for an aperture in a bearing housing, and one or more bearing shoes tiltably carried and laterally engaged by said cap and operatively positioned by mounting said cap in position.

22. A thrust bearing for horizontal or inclined shafts including a rotatable thrust collar, a housing therefor provided with an aperture, a closure member for said aperture provided with one or more recesses and one or more bearing shoes mounted in said recesses in operative relation to said collar when said closure member closes said aperture, said shoes being held in operative position against relative displacement by the sides of said recesses.

23. A thrust bearing for horizontal or inclined shafts including a rotatable thrust collar, a housing therefor provided with an aperture, a closure member for said aperture provided with one or more recesses, and one or more bearing shoes mounted in said recesses in operative relation to said collar when said closure member closes said aperture, the sides of said recesses cooperating with said shoes to withdraw said shoes from said collar when said closure member is removed from said aperture.

24. A thrust bearing for horizontal or inclined shafts including a rotatable thrust collar, a housing therefor provided with an aperture, a closure member for said aperture provided with one or more recesses, one or more bearing shoes mounted in said recesses, and one or more elements insertible into apertures in said closure member and cooperating with said shoe or shoes for tiltably mounting the same and for adjustably positioning the same in load-sustaining relation with said collar.

In testimony whereof I have signed this specification.

HARRY A. S. HOWARTH.